United States Patent [19]

Vishnevsky et al.

[11] Patent Number: 4,959,580
[45] Date of Patent: Sep. 25, 1990

[54] PIEZOELECTRIC MOTOR

[75] Inventors: Vladimir S. Vishnevsky; Vyacheslav V. Lavrinenko, both of Kiev, U.S.S.R.

[73] Assignee: Kievsky Politekhnichesky Institut Imeni, Kiev, U.S.S.R.

[21] Appl. No.: 283,486

[22] PCT Filed: Feb. 26, 1987

[86] PCT No.: PCT/SU87/00027

§ 371 Date: Oct. 24, 1988

§ 102(e) Date: Oct. 24, 1988

[87] PCT Pub. No.: WO88/06816

PCT Pub. Date: Sep. 7, 1988

[51] Int. Cl.⁵ .............................................. H01L 41/08
[52] U.S. Cl. .................................................... 310/323
[58] Field of Search ............................... 310/323, 328

[56] References Cited

U.S. PATENT DOCUMENTS

| 3,211,931 | 10/1965 | Tehon | 310/323 X |
| 4,400,641 | 8/1983 | Vishnevsky et al. | 310/328 X |
| 4,453,103 | 6/1984 | Vishnevsky et al. | 310/328 X |

FOREIGN PATENT DOCUMENTS

| 0126873 | 6/1987 | Japan | 310/323 |
| 0817816 | 4/1981 | U.S.S.R. | 310/323 |
| 1023457 | 6/1983 | U.S.S.R. | 310/323 |
| 1070628 | 1/1984 | U.S.S.R. | 310/323 |
| 2118374 | 10/1983 | United Kingdom . | |
| 2120462 | 11/1983 | United Kingdom . | |

Primary Examiner—Mark O. Budd
Attorney, Agent, or Firm—Lilling and Lilling

[57] ABSTRACT

A piezoelectric motor comprises includes a stator (1) and a rotor (3). The stator (1) has a housing (7), a piezoelectric oscillator (6) generating radial mode vibrations and mounted on the housing (7), said oscillator including a piezoelectric cell (9) with electrodes (13) and at least two pushers (10). Each pusher (10) has one end secured to at least one flat surface of the piezoelectric cell (9) so that a gap (14) is provided between the piezoelectric cell (9) and the pusher (10). The other end of each pusher (10) rests against the rotor (3).

2 Claims, 4 Drawing Sheets

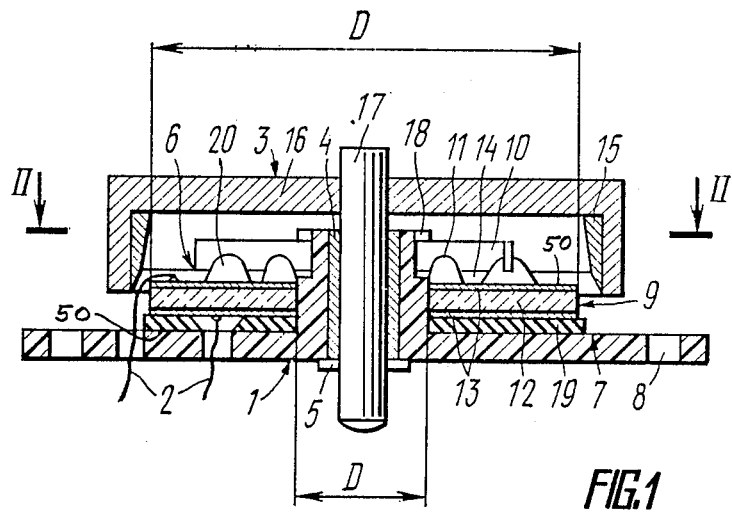
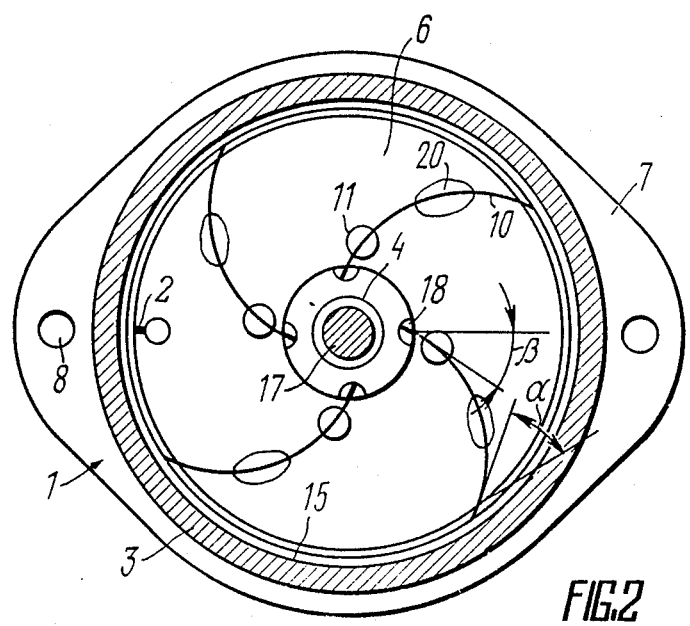

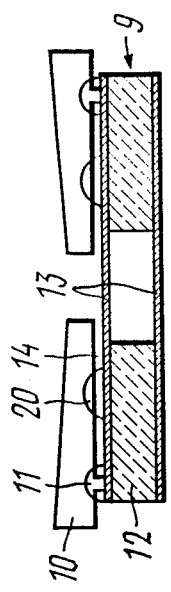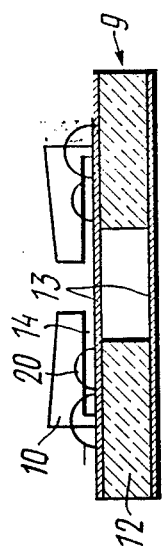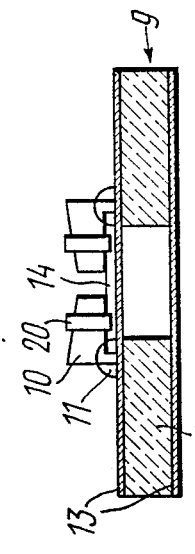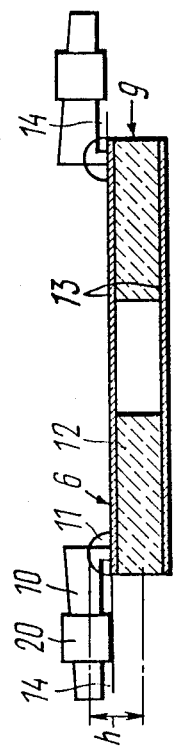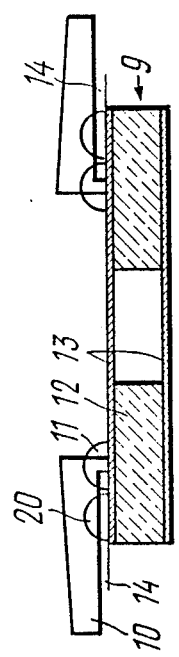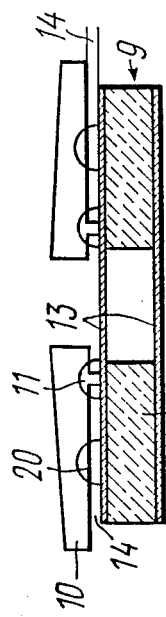

PIEZOELECTRIC MOTOR

BACKGROUND OF THE INVENTION

1. Field of the Invention

The present invention relates to piezoelectric devices and, more particularly, to piezoelectric motors.

2. Description of the Prior Art

Known in the art is a piezoelectric motor (GB,A, 2118374B), comprising a stator, a rotor frictionally interacting with the stator having a housing, a piezoelectric oscillator producing radial mode vibrations mounted on the housing and comprising a piezoelectric cell disposed coaxially with the rotor and made in the form of a disk with electrodes, the disk being polarized perpendicular to the electrodes, and at least two pushers, each pusher having one end secured on the cylindrical surface of the piezoelectric cell and another end resting against the rotor.

In this piezoelectric motor any change of the rotational speed can be effected only by changing the diameter of the piezoelectric cell. This does not allow one to make a general-purpose piezoelectric cell suitable for any rotational speed of the rotor of the piezoelectric cell suitable for any rotational speed of the rotor of the piezoelectric motor. Therefore, the range of rotational speeds of the rotor for a given piezoelectric cell is limited.

Furthermore, the robustness of the pusher increases with the increase in the thickness of the piezoelectric cell and this does not allow one to reduce the input power, for example, when running the piezoelectric motor under a low load, e.g. for driving the diaphragm of a photographic camera.

SUMMARY OF THE INVENTION

The basic object of the invention is to provide a piezoelectric motor having a design which permits the axis of symmetry of each pusher to be displaced so that it becomes parallel to the axis of symmetry of the piezoelectric cell by converting the radial acoustic vibrations in the piezoelectric cell into transverse vibrations and then into longitudinal acoustic vibrations in the pushers of the piezoelectric radial mode oscillator. This widens the range of rotational speeds of the rotor for a given piezoelectric cell and the range of input power of the motor.

This object is attained by providing a piezoelectric motor comprising a stator, a rotor frictionally interacting with the stator, having a housing, a piezoelectric oscillator producing radial mode vibrations mounted on the housing and comprising a piezoelectric cell disposed coaxially to the rotor and made in the form of a disk with electrodes, the disk being polarized perpendicular to the electrodes, and at least two pushers, each of which has one end secured on the piezoelectric cell and has another end resting against the rotor. According to the invention, one end of each pusher is secured on at least one flat surface of the piezoelectric cell so that a gap is provided between the piezoelectric cell and the pusher.

This invention makes it possible to produce a number of piezoelectric motors featuring a wide range of input power.

The present invention also makes it possible to produce piezoelectric motors with general-purpose piezoelectric cells featuring a wide range of rotational speeds of the rotor and a wide range of input power. The invention allows one to reduce the cost of a piezoelectric motor so that it can be used as an actuating drive instead of electric magnets, and also to reduce the labour consumption in manufacture of piezoelectric motors.

BRIEF DESCRIPTION OF THE DRAWINGS

The invention is further described by way of example with reference to the accompanying drawings, in which:

FIG. 1 is a longitudinal sectional view of a piezoelectric motor featuring a cylindrical rotor encompassing pushers pressed thereto, according to the invention;

FIG. 2 shows a view taken along the line II—II of FIG. 1;

FIGS. 3a, 3b, 3c show a piezoelectric cell carrying pushers secured thereon for the piezoelectric motor having a rotor encompassing the pushers;

FIGS. 3d, 3e, 3g show a piezoelectric cell carrying pushers secured thereon for a piezoelectric motor having a rotor disposed between the pushers;

DESCRIPTION OF THE PREFERRED EMBODIMENTS

Figure 4:
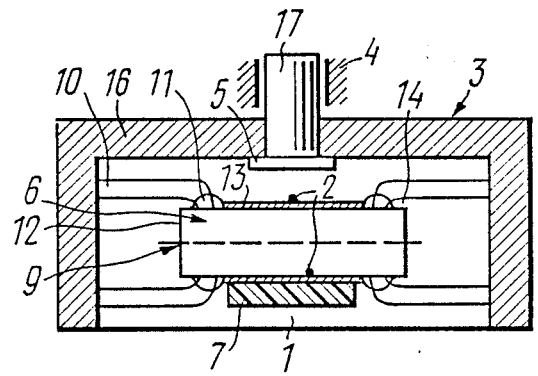
FIG. 4 is a schematic view of a piezoelectric motor, in which the pushers are secured on two flat surfaces of a piezoelectric cell for a rotor encompassing the pushers.

The piezoelectric motor comprises a stator 1 (FIG. 1) having terminals 2 for connection to an a.c. voltage source (not shown). The stator 1 is a stationary part of the piezoelectric motor relative to the unit (not shown) in which it is mounted. The rotor 3 of the piezoelectric motor is mounted on the stator 1 so it can rotate in a bearing 4 and is fixed thereto to avoid axial motion by a detachable joint 5, e.g. a lock washer.

The stator 1 of a piezoelectric motor comprises a piezoelectric radial mode oscillator 6 acoustically insulated from the housing 7 of the stator 1 and secured thereon. The housing 7 is used for protection of the piezoelectric radial mode oscillator 6 against damage and for mounting of the piezoelectric motor in the unit by means of mounting holes 8.

The piezoelectric radial mode oscillator 6 is an electromechanical device intended for conversion of electric energy into oscillatory motion of the particles of the solid body of the piezoelectric oscillator 6, substantially in the radial direction of a piezoelectric cell 9 made in the form of a body of revolution which serves as an active part of the oscillator 6.

In contrast to the active part of the piezoelectric radial mode oscillator 6, the passive part of the same does not convert one kind of energy into another. The passive part of the piezoelectric radial mode oscillator 6 includes pushers 10 and an acoustically conductive body 11 connecting these pushers 10 to the piezoelectric cell 9. In the given embodiment of the piezoelectric radial mode oscillator 6, four pushers 10 are provided. To exclude any effort from the rotor 3 to the stator 1, the minimum quantity of pushers 10 must be two. When the number of pushers 10 is two or more (with uniform distribution of these pushers), the total force of each pusher 10 applied to rotor 3 is approximately zero. In this case, the more the number of pushers 10, the higher the torque of the rotor 3. It becomes necessary to step up the power supply voltage for the piezoelectric motor, and this limits the maximum number of pushers 10 to approximately thirty two. One end of each pusher 10 is fixed to at least one flat surface of the piezoelectric cell 9, while the other end rests against the rotor 3.

Each pusher 10 is a flat spring made of an elastic sound conducting material, e.g. steel or SPR paper laminate. As a rule, each pusher 10 is rectangle-shaped. The pushers 10 may have another shape, for example, narrowing towards the free end or be provided with projections for fixing the piezoelectric radial mode oscillator 6 or for fixing the pushers 10 themselves. In doing so, the parameters of the piezoelectric motor do not deteriorate.

The pushers 10 are pressed to the rotor 3 due to the elastic properties of the pushers 10 themselves. For this purpose, the ends of the pushers 10 are bent when installing the rotor 3 on the stator 1. However, the pushers 10 can also be pressed to the rotor 3 by applying an axial force to the rotor 3, e.g. making use of the weight of the rotor 3 itself or by means of an electric magnet, a flat spring or a helical spring. (not shown in FIG. 1).

The acoustically conducting body 11 connecting the pushers 10 to the piezoelectric cell 9 is solidified solder or a rigid mass of organic compound, for example, polymerized epoxy resin.

To produce radial vibrations in the piezoelectric oscillator 6, the piezoelectric cell 9 is made in the form of a disk 12 with electrodes 13 on the flat surfaces of the disk 12, to define major flat top and bottom surfaces 50 said electrodes being made in the form of a thin metallic coating obtained by evaporation of metal in vacuum, burning-in silver or chemical precipitation of metal in a solution. The voltage from the power supply source (not shown in FIG. 1) is applied to the electrodes 13 through terminals 2 which are soldered to the electrodes 13 as shown in FIG. 1, or connected by the contact method. The part of the pushers 10, which is not coated by the binding conducting body 11, is installed on the flat surface of the piezoelectric cell 9 with a gap 14 between the major flat top surface 50 of the piezoelectric cell 9 and an associated pusher 10. The gap 14 is adequate for the assembly of the piezoelectric motor so that the pusher 10 does not touch the electrode 13 of the piezoelectric cell 9. In other words, if during the assembly, for example, ten piezoelectric motors in one of them the pusher 10 touches the electrode 13, the construction of this motor should be modified by making the gap 14 twice as large. The disk 12 is made of a polycrystalline material featuring piezoelectric properties. The piezoelectric properties in the polycrystalline material are originated by providing remanent polarization. The process of producing remanent polarization is actually polarization of this material. The material for the piezoelectric cell 9 of a piezoelectric motor is preferably based on a solid solution of titanate of lead zirconate.

The electrodes 13 are required for polarization of the material. A polarizing voltage is applied to these electrodes. In this case the direction of polarization of the piezoelectric cell 9 coincides with the vector of the polarizing field intensity, i.e. perpendicular to the surface of the electrodes 13. In order to produce radial vibrations in the piezoelectric radial mode oscillator 6 at the working frequency of the piezoelectric motor, it is expendient that the maximum diameter $D_1$ of the piezoelectric cell 9 or the difference of the diameters $D_1 - D$, where D is the diameter of the hole of the disk 12, is equal to the half length of the wave of the radial acoustic vibrations. This is attained using the following formula:

$$\frac{\lambda}{2} \approx N/f \qquad (1)$$

wherein

N is the frequency constant of the material of the piezoelectric cell 9 depending on the velocity of sound in this material;

f is the resonance frequency of radial vibrations.

The rotor 3 of the piezoelectric motor consists of three parts. The first part is a frictional part 15 consisting of a ring with a cylindrical or conical surface. This part frictionally interacts with the pushers 10. The frictional part 15 must be made of a wear-resistant material with minimal roughness of the surface for reducing the wear of the pushers 10. Piezoelectric motors rated for a long service life are provided with a frictional part made of alumina-based powdered ceramic material or thermosetting plastics such as Getinaks (paperbased laminate). The frictional part 15 is rigidly secured on the second part of the rotor 3 of the piezoelectric motor, i.e. a cup 16. Mounted in the cup 16 is the third part of the rotor 3 of the piezoelectric motor, i.e. a shaft 17, which is capable of rotating in the bearing 4, axial motion being prevented by a detachable joint 5 squeezing the shaft 17. In piezoelectric motors whose life is not a decisive factor, all three parts of the rotor 3 or a combination of any two parts are made of the same material, e.g. of steel.

The piezoelectric radial mode oscillator 6 is secured with respect to the housing 7 by means of slots 18 in the housing 7, the ends of the pushers 10 resting in these slots. The use of other methods of fixing the piezoelectric radial mode oscillator 6, for example by means of an elastic adhesive does not affect the essence of the invention provided that the piezoelectric radial mode oscillator 6 is acoustically insulated from the housing 7. In the piezoelectric motor under consideration the acoustic insulation of the piezoelectric radial mode oscillator 6 from the housing 7 is effected by means of a gasket 19, e.g. made of rubber. In order to increase the piezoelectric motor longevity, the pushers 10 are damped by means of dampers 20, which are made of rubber. The material of the dampers 20 in a liquid state (prior to polymerization) is applied in the form of drops on the pushers 10 so that this material flows over the surface of the electrode 13 encompassing the pushers 10; then this material polymerizes.

FIG. 2 shows the piezoelectric motor, taken along a section line II—II in FIG. 1. The angle $\alpha$ (FIG. 2) is formed by a tangent drawn from the surface of the pusher 10 through the point of contact with the frictional part 15 and by a tangent drawn to the surface of the frictional part 15 through the point of contact with the pusher 10.

The angle $\alpha$ must be less than 90° and be in the range from 45° to 85°. If the angle $\alpha$ is less than 45°, the efficiency of the piezoelectric motor is reduced. If the angle $\alpha$ exceeds 85°, the torque of the rotor 3 drops down and this also reduces the efficiency. The rotational speed ω and the torque M of the rotor 3 depend on the angle α in the following way:

$$\omega \sim \frac{1}{\cos\alpha} \quad (2)$$

$$M \sim \cos\alpha \quad (3)$$

The angle α, which is formed by the tangent drawn to the surface of the pusher 10 at the point of its fixing and the line of the plane extending through the fixed end of the pusher 10 and the axis of rotation of the rotor 3 has a small effect on the rotational frequency ω and the torque M of the rotor 3.

FIGS. 3a, 3b, 3d, 3e, 3g show the piezoelectric cell carrying the pushers 10 with different distances between the fixed end of the cell and the center of the disk 12. The shift of the middle line of the pusher 10 relative to the middle line of the disk 12 by a value h exceeding the thickness of the disk 12 makes it possible to move the pusher 10 in the radial direction. In this case the pushers 10 can be fixed either on the edges of the disk 12, as shown in FIGS. 3a, 3b, 3c, 3d, or in the central portion of the disk 12, as shown in FIGS. 3b, 3e. Such fixing of the pushers 10 can be provided both for the piezoelectric radial mode oscillator 6 (FIGS. 3a, 3b, 3c) designed for low-speed piezoelectric motors with a rotor 3 encompassing pushers 10 and for the piezoelectric radial mode oscillator 6 (FIGS. 3d, 3e, 3g) designed for high-speed piezoelectric motors having a rotor 3 disposed between the pushers 10. By changing the point of fixing the pushers 10, as well as by changing the length of the pushers 10, one can change the diameter of the rotor 3 thus widening the range of rotational speeds of the rotor 3 for one type and size of the piezoelectric cell 9. If the pushers 10 considerably extend beyond the range of the piezoelectric cell, their damping is effected by means of a damper 20 made in the form of a rubber tube put on the end of the pusher 10, for example, as shown in FIG. 3 or 3g.

FIG. 4 shows a piezoelectric motor, in which the pushers 10 are fixed on both flat surfaces of the piezoelectric cell 9. This is equivalent to connection of two piezoelectric radial mode oscillators 6 which are conditionally separated by a broken line. The fixing of the pushers 10 on both flat faces of the piezoelectric cell 9 is used for increasing the volume of the piezoelectric radial mode oscillator 6 so that the power on the shaft of the piezoelectric motor is increased.

Figure 5:
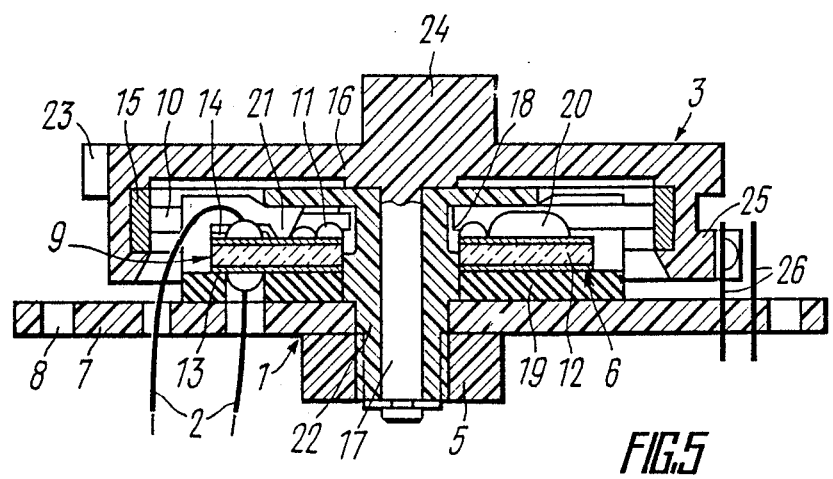
FIG. 5 is a longitudinal sectional view of a low-speed piezoelectric motor for actuating drives.

An embodiment of a low-speed piezoelectric motor used as an electric magnet is shown in FIG. 5. In this case the piezoelectric radial mode oscillator 6 is fixed by means of slots 18 and a shaped gasket 19 with projections 21 disposed between the pushers 10. The detachable part 22 of the housing 7, which also serves as a bearing, presses the projection 21 to the piezoelectric cell 9 by means of a nut 5 so that the angular position of the piezoelectric radial mode oscillator 6 is fixed. The cup 16 and the shaft 17 are made, like the components of the housing 7, of plastic material by injection moulding. This makes it possible to provide teeth 23 of a gear wheel, an eccentric projection 24 for converting rotary motion into reciprocatingg motion and a side projection 25 on the cup 16. The side projection 25 interacts with a contact pair 26 forming therewith a position indicator to indicate the position of the rotor 3.

Figure 6:
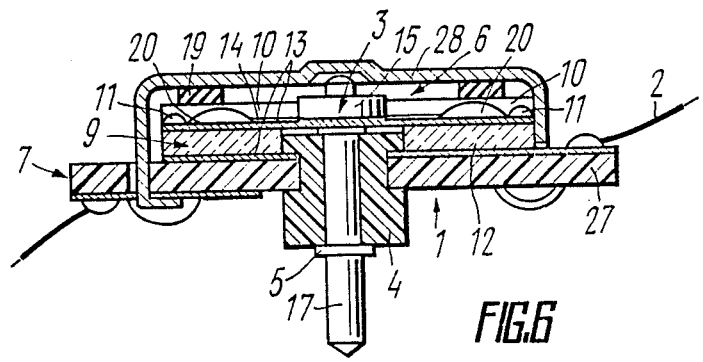
FIG. 6 is a longitudinal sectional view of a high-speed piezoelectric motor, in which the piezoelectric cell is connected by contact method.

An embodiment of a high-speed piezoelectric motor having a rotor 3 disposed between the pushers 10 is shown in FIG. 6. In this motor the housing 7 has a textolite plate 27 metallized at both sides and a cover 28 made of metal. The cover 28 is electrically connected to one of the electrodes 13 of the piezoelectric cell 9 through a gasket 19 made of an elastic current-conducting material and pushers 10. The other electrode is pressed by the contact method to the metallized surface of the plate 27. The terminals 2 from the metallized surfaces 27 are used for applying an electric voltage to the piezoelectric motor, in which case the metallized surface is electrically connected to the cover 28 by means of soldering.

Figure 7:
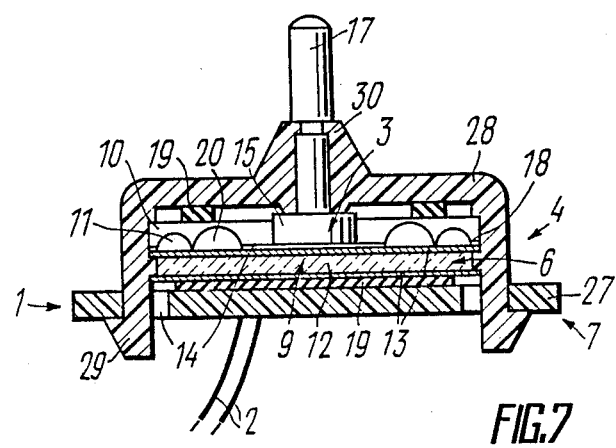
FIG. 7 is a longitudinal sectional view of a piezoelectric motor, in which the piezoelectric cell is made in the form of a disk having no hole.

FIG. 7 shows piezoelectric motor having a piezoelectric cell 9 in the form of a disk 12 having no hole. In this motor the cover 28 is connected through projections 29 to a plate 27 of the housing 7. The slots 18 made in the cover 28 are used for fixing the piezoelectric radial mode oscillator 6 in the radial direction, while in the axial direction the piezoelectric radial mode oscillator 6 is fixed by means of a gasket 19 made in the form of a rubber ring. To prevent any displacement of the rotor 3 along its axis, the shaft 17 of the rotor 3 is provided with an annular groove, which accommodates the annular projection 30 of the cover 28.

The claimed piezoelectric motor operates as follows. The supply voltage from a power source having a frequency equal or close to one resonance frequency of the longitudinal radial vibrations of the piezoelectric radial mode oscillator 6 (FIG. 1) is applied to the electrodes 13 of the piezoelectric cell 9 exciting therein longitudinal radial vibrations. These vibrations are transferred to the pushers 10 through the acoustically conductive body 11. The pushers 10 are moved along the surface of the piezoelectric cell 9, therefore, the longitudinal radial vibrations are first converted into transverse acoustic vibrations at the point of fixing the pushers 10 to the piezoelectric cell 9. The transverse vibrations are reflected from the end of the pushers 10 and are again converted into longitudinal radial vibrations spreading in the pushers 10. These longitudinal radial vibrations are shifted with respect to the longitudinal radial vibrations excited in the piezoelectric cell 9 by a value h (FIG. 3a). In this case the converted portion of acoustic energy in the form of energy of transverse vibrations, but the larger portion of the energy is energy of longitudinal vibrations. By selecting the frequency of the a.c. voltage supply source close to the resonance frequency of the longitudinal vibrations, one can eliminate the effect of the transverse vibrations on the operation of the piezoelectric motor. Owing to the fact that the angle α is lower than 90°, a force originates in the zone of contact of the pushers 10 with the rotor 3 tangentially to the rotor 3 causing its rotation in the bearing 4. This force is transmitted to the shaft 17 through the cup 16. If the piezoelectric motor is not fixed, the stator 1 and rotor 3 move in the opposite directions. In order to prevent rotation of the stator 1, the latter is secured to the unit through the holes 8. The forces, which can arise in the rotor 3, are balanced by the members fixing the shaft 17 in the direction of the axis of the rotor 3, in particular, by the detachable joint 5. The torque of the rotor 3 arising due to the tangential forces tends to turn the piezoelectric radial mode oscillator 6 in the housing 7. However this is prevented by the slots 18. In the zone of contact of the pushers 10 with the rotor 3, in addition to the tangential force, there arises an alternating force tending to excite subharmonic flexural vibrations in the pushers 10, i.e. vibrations with a frequency below the frequency of the power supply voltage of the piezoelectric motor. The damper 20 effectively attenuates the flexural vibrations, since the pliability of the pushers 10 to flexure is comparable to the elasticity of the damper 20. As a result, having no effect on the longitudinal vibrations in the pushers 10, the dampers 20 exclude self-excitation of subharmonic vibrations that would reduce the life of the piezoelectric motor and amplify audio noise. When the pusher 10 contacts the electrode 13, a chopper contact of the pushers 10 with the piezoelectric cell 9 takes place. The longitudinal vibrations in the pusher 10 become unstable and parasitic subharmonic vibrations appear, which drastically reduce the efficiency. For eliminating this phenomenon, the pushers 10 are mounted relative to the surface of the piezoelectric cell 9 with a gap 14. The value of the gap 14 is selected so that under the effect of impact and vibrational loads and temperature effects there is no mechanical contact between the pushers 10 and the surface of the piezoelectric cell 9. The gap 14 is usually taken in the range of 0.2 to 0.3 mm and is increased with an increase in the size of the piezoelectric radial mode oscillator 6. If the gap 14 is lower than 0.2 mm a mechanical contact occurs between the pushers 10 and the surface of the piezoelectric cell 9 under the effect of external vibrational loads on the piezoelectric motor. This results in higher acoustic noise. When the gap 14 exceeds 0.3 mm, the piezoelectric motor efficiency drops.

The mechanism of the excitation of longitudinal vibrations in the pushers 10 is not changed if the place of fixing the pushers 10 is displaced along the radius from one end of the piezoelectric cell 9 to the other end. In this case, a turn of the pusher 10 through 180° relative to the fixing point changes the phase of the longitudinal vibrations. However, this has no effect, for example, on the efficiency of the piezoelectric motor. The operation of the piezoelectric motor does not change if the pushers 10 are located at both sides of the piezoelectric cell 9 (FIG. 4). The location of the pushers 10 on the two flat surfaces of the piezoelectric cell 9 makes it possible to double the volume of the piezoelectric cell 9, thus increasing the power of the piezoelectric motor, and to widen the range of the input power.

The piezoelectric motor which has an external rotor 3 (FIG. 5) encompassing the pushers 10 develops high torques, which are converted into longitudinal forces by means of an eccentric projection 24. Such motors are momentum piezoelectric motors. They are equipped with limit switches in the form of a side projection 25 interacting with a contact pair 26. These motors are used for replacement of electric magnets. When provided with teeth 23, these piezoelectric motors can also be used as low-speed rotary drives.

High-speed piezoelectric motors have found applications in tape transport mechanisms. In these motors the current conducting wires are led through a cover 28 (FIG. 6) and the gasket 19, and the power supply can also be provided due to direct contact of the electrode 13 with the metal coating of the plate 27.

A piezoelectric motor with a piezoelectric cell 9 (FIG. 7) in the form of a disk 12 having no hole may find application in toys. Its design simplicity is obtained due to the shape of the cover having projections 29, which provide quick assembly of the stator 1 and the rotor 3, as well as due to the annular groove and the annular projection 30 fixing the rotor 3 in the axial direction.

Thus, the present invention makes it possible to widen the range of rotational speeds of the rotor 3 for a given piezoelectric cell 9 and to widen the range of input powers of the piezoelectric motor.

Since the piezoelectric motor is provided with an external rotor 3 (FIG. 5) and an enveloping pusher 10, substantial rotational moments can be achieved and converted into longitudinal thrust by the eccentric projection 24. Such motors are torque piezoelectric motors. They are equipped with end switches made as the lateral projection 25 interacting with the contact pair 26. These motors are used to replace electric magnets. When provided with teeth 23, these piezoelectric motors can be operated as low-speed rotational drives.

Tape transport devices use high-speed piezoelectric motors. In these motors, current passes through the cover 28 (FIG. 6) and the gasket 19 and, also, by direct contact of the electrode 13 with the metal coating of the plate 27.

The piezoelectric motor equipped with the piezoelectric element 9 (FIG. 7) made as a disk 12 without the opening may find application in childrens toys. The construction is very simple featuring a cover 28 with projections 29. The stator 1 and rotor 3 can be quickly assembled due to the annular groove and annular projection 30 securing the rotor 3 axially.

Thus, this invention can help expand the range of speed of the rotor 3 for a particular piezoelectric element 9 and provide a wider range of power consumption of the motor.

The invention can be used as a nongeared electric motor performing continuous or discontinuous (step-by-step) rotary motion. These motors are used in actuators of automatic systems instead of electric magnets, in drives of tape transport mechanisms of tape recorders and in drives of movie equipment.

We claim:

1. A piezoelectric motor comprising a stator (1) having a housing (7); a rotor (3) frictionally interacting with said stator (1); a piezoelectric radial mode oscillator (6) mounted on said housing (7), said oscillator comprising a piezoelectric cell (9) disposed coaxially to the rotor (3) and made in the form of a disk (12) with electrodes (13) and defining major flat top and bottom surfaces (50), said disk (13) being polarized perpendicular to said electrodes (12); at least two pushers (10), each pusher having one end secured on said peizoelectric cell (9) and having another end resting against said rotor (3), one end of each pusher (10) being secured on at least one flat major surface (50) of said piezoelectric cell (9) so that a gap (14) is provided between said at least one flat major surface (50) of said piezoelectric cell (9) and an associated pusher (10).

2. A piezoelectric motor comprising a stator (1) having a housing (7) and terminals (2) for connection to a source of a.c. voltage of a desired frequency; a rotor (3) having a frictional part (15) to frictionally interact with said stator (1); a piezoelectric oscillator (6) for producing radial oscillations at a desired frequency mounted on said housing (7) and having a piezoelectric cell (9) mounted coaxially with said rotor (3) and made in the form of a disk (12) having two major flat surfaces (50), the diameter of said disk being equal to one half the radial wavelength at a desired frequency, said piezoelectric cell (9) having electrodes (13) and being polarized normally to said electrodes (13); and at least two pushers (10), each of which has one of its ends secured to said piezoelectric cell (9), said pushers (10) and said frictional part (15) of said rotor (3) being disposed in at least one of the spaces beyond said piezoelectric cell (9) defined by said flat surface (50) of said piezoelectric cell and a plane parallel to and spaced at a distance from said flat surface (50), the wide surface of said pushers (10) being normal to said flat surface (50) of said piezoelectric cell and one of the ends of said pushers (10) being secured to said surface (50).

* * * * *